United States Patent [19]
Sommer

[11] Patent Number: 5,793,812
[45] Date of Patent: Aug. 11, 1998

[54] LINE DRIVER CIRCUIT FOR REDUNDANT TIMING SIGNAL GENERATORS

[75] Inventor: Jeremy S. Sommer, Los Altos, Calif.

[73] Assignee: Hewlett-Packard Company, Palo Alto, Calif.

[21] Appl. No.: 603,618

[22] Filed: Feb. 21, 1996

[51] Int. Cl.$^6$ .............................. H04L 25/02; H04B 03/02
[52] U.S. Cl. ..................... 375/257; 375/377; 327/309; 333/101; 307/57
[58] Field of Search .................................. 375/257, 377, 375/219, 258, 224, 286, 288, 319, 317, 260, 349, 354; 327/108, 306, 309, 321; 307/57, 84, 87; 323/355; 333/3, 101, 100

[56] References Cited

U.S. PATENT DOCUMENTS 5,235,617  8/1993  Mallard, Jr. ........................... 375/288
5,513,218  4/1996  Moller ................................... 375/257

FOREIGN PATENT DOCUMENTS 5-303-458  11/1993  Japan .

*Primary Examiner*—Stephen Chin
*Assistant Examiner*—Betsy L Deppe
*Attorney, Agent, or Firm*—John L. Imperato

[57] ABSTRACT

In the present invention, a line driver circuit enables multiple timing signal generators to simultaneously deliver a timing signal to a load. The multiple or redundant timing signal generators each having a line driver circuit, provide an uninterrupted timing signal that is independent of failures of individual timing signal generators. The multiple timing signal generators share the task of providing the timing signal, i.e. power, to the load. In the event of a failure of one of the timing signal generators, the task of providing power to the load shifts to other of the multiple signal generators, maintaining an uninterrupted timing signal, undisturbed in amplitude, phase and pulse shape. The line driver of each timing signal generator has a drive capability to exceed that required for the timing signal. A voltage clamp regulates the amplitude of the timing signal when the timing signal generators are simultaneously functioning.

10 Claims, 2 Drawing Sheets

LINE DRIVER CIRCUIT FOR REDUNDANT TIMING SIGNAL GENERATORS

FIELD OF THE INVENTION

The present invention relates to timing signals in digital telecommunication networks and, more particularly, to a line driver circuit for providing the timing signals.

BACKGROUND OF THE INVENTION

Digital telecommunication networks rely on timing signals for data synchronization. Disturbances or interruptions in a timing signal may impair the performance of equipment downstream in the network which relies upon the timing signal. Systems in which only one timing signal generator is actively providing the timing signal, are especially vulnerable to disturbances in the waveform of the timing signal. In the event of a failure of the timing signal generator, the timing signal is interrupted until the failure is recognized. Once a failure is recognized, a back-up timing signal generator is activated to provide the timing signal. The timing signal from the back-up timing signal generator may be activated within a short time of the failure to minimize interruption of the timing signal. However, disturbances in the amplitude, phase or pulse shape of the timing signal during the transition to the back-up timing signal generator are inevitable in these systems having single activated timing signal generators.

SUMMARY OF THE INVENTION

In the present invention, a line driver circuit enables multiple timing signal generators to simultaneously deliver a timing signal to a load. The multiple or redundant timing signal generators each having the line driver circuit, provide an uninterrupted timing signal that is independent of failures of individual timing signal generators. The multiple timing signal generators share the task of providing the timing signal, i.e. power, to the load. In the event of a failure of one of the timing signal generators, the task of providing power to the load shifts to other of the multiple signal generators. As the task of power delivery is shifted, the line driver circuit maintains an uninterrupted timing signal, undisturbed in amplitude, phase and pulse shape. The line driver of each timing signal generator has a drive capability to exceed that required for the timing signal. The excess drive capability ensures that each of the multiple timing signal generators can provide the necessary power to the load and also overcome the power loss that faults in the other timing signal generators may cause. A voltage clamp regulates the amplitude of the timing signal when the timing signal generators are simultaneously functioning.

DETAILED DESCRIPTION OF THE PREFERRED EMBODIMENT

Figure 1:
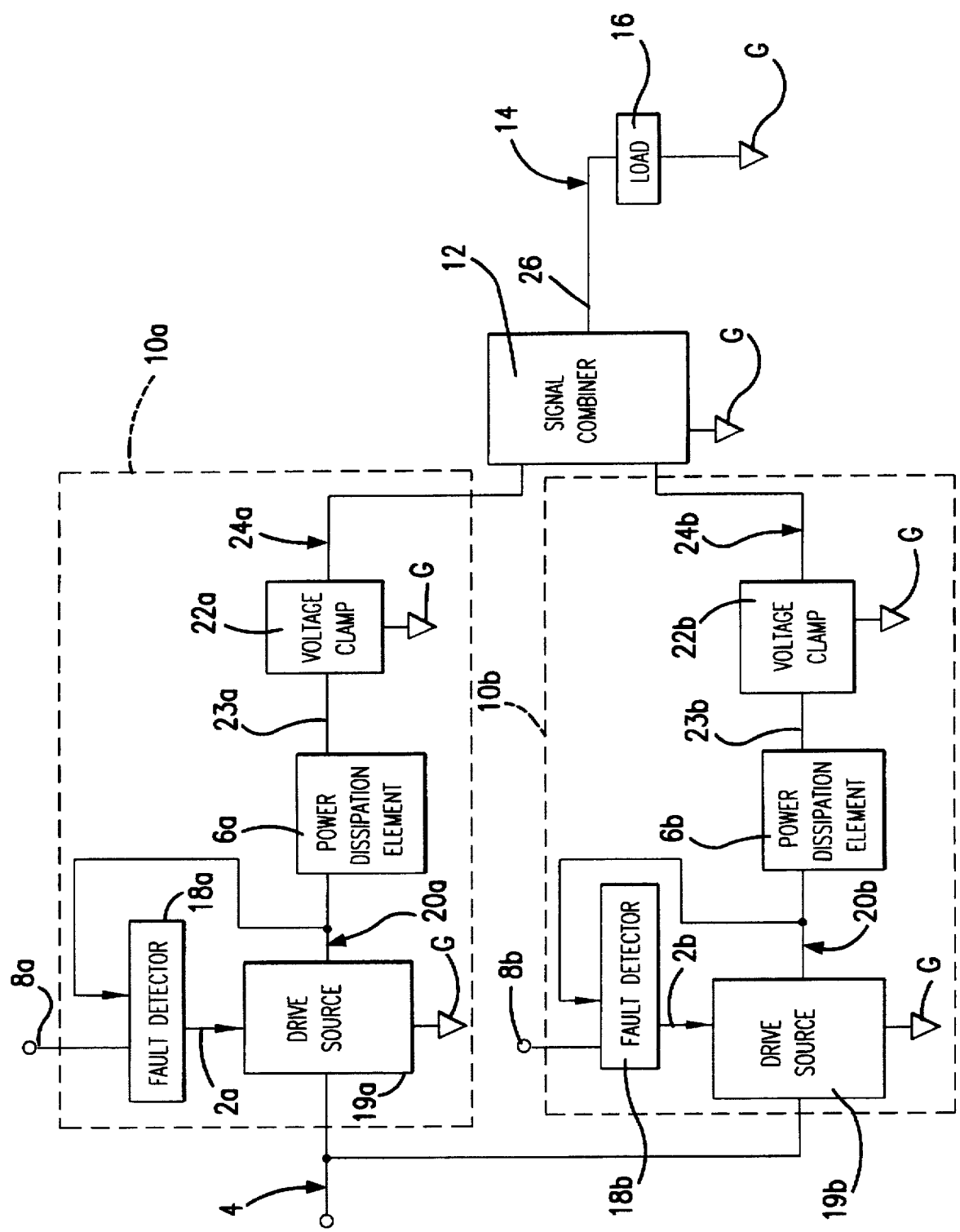
FIG. 1 shows a functional diagram of redundant line drivers of the present invention.

FIG. 1 shows a functional diagram of redundant line drivers 10a, 10b of the present invention. A pair of line drivers is shown, but two or more line drivers may be connected to a signal combiner 12 to drive a load 16. Each line driver 10a, 10b is incorporated in a timing signal generator (not shown). When the line drivers 10a, 10b are functioning properly, they share the task of delivering the timing signal 14 to the load 16. In the event that a fault condition is acknowledged by a fault detector 18a, 18b, the drive source 19a, 19b of the corresponding line driver 10a, 10b may be disabled, or squelched, using a squelch signal 2a, 2b. The (unsquelched) drive source of the functioning line driver then delivers the timing signal 14 to the load 16. A functional description of line driver 10a is described, although the operation of line driver 10b is identical to that of line driver 10a.

The input to line driver 10 is a drive sync signal 4. The drive sync signal 4 is applied to drive source 19a. Drive source 19a is referenced to reference point G which may be ground or another predetermined reference point. The drive source 19a has a power drive capability exceeding that required of the timing signal 14, ensuring that each drive source (in the event of multiple line drivers) is capable of not only supplying the timing signal 14 to the load 16 but also overcoming the power loss that faults in other of the line drivers may cause.

The drive source 19a produces a drive signal 20a which is applied through a power dissipation element 6a to voltage clamp 22a. The power dissipation element facilitates operation of the voltage clamp 22a. For example, if the voltage clamp 22a comprises a low impedance shunt, switched between signal line 23a and reference point G, the power dissipation element 6a provides the power dissipation for voltage division of the drive signal 20a between the low impedance shunt and the power dissipation element 6a. The voltage clamp 22a produces a clamped signal 24a which is supplied to the signal combiner 12.

While the voltage clamp 22a may limit the voltage of the drive signal 20a to produce the clamped signal 24a, the voltage clamp 22a also shunts excess current supplied by the drive source 19a. In the event that another of the redundant line drivers (i.e. 10b) fails and more current is needed to supply the timing signal 14 to the load 16, less excess current is shunted and more is diverted to the load 16. Thus, a functioning line driver compensates for a faulty line driver by supplying more current to the load 16 which is necessary to maintain the amplitude, phase and pulse shape of the timing signal 14.

The signal combiner 12 receives the clamped signals 24a, 24b from multiple line drivers 10a, 10b. The signal combiner 12 provides the timing signal 14 at its output 26. The amplitude of the timing signal 14 may be equal to the amplitude of each of the received clamped signals 24a, 24b. The current delivered to the load 16 is shared by the drive sources 19a, 19b supplying each of the applied clamped signals 24a, 24b to the signal combiner 12. The proportion of the current supplied by each drive source is varied as a result of squelching of drive sources using squelch signals 2a, 2b. As a drive source is squelched, the remaining, unsquelched drive sources each supply more current to the load 16. Stabilization of the amplitude, phase and pulse shape of the timing signal 14 in the presence of faults is achieved by minimizing the power loss between the voltage clamps 22a, 22b and the load 16. Drive sources 19a, 19b may also be squelched as a result of faults reported to fault detectors 18a, 18b from elsewhere in the timing signal generator at fault inputs 8a, 8b.

Figure 2:
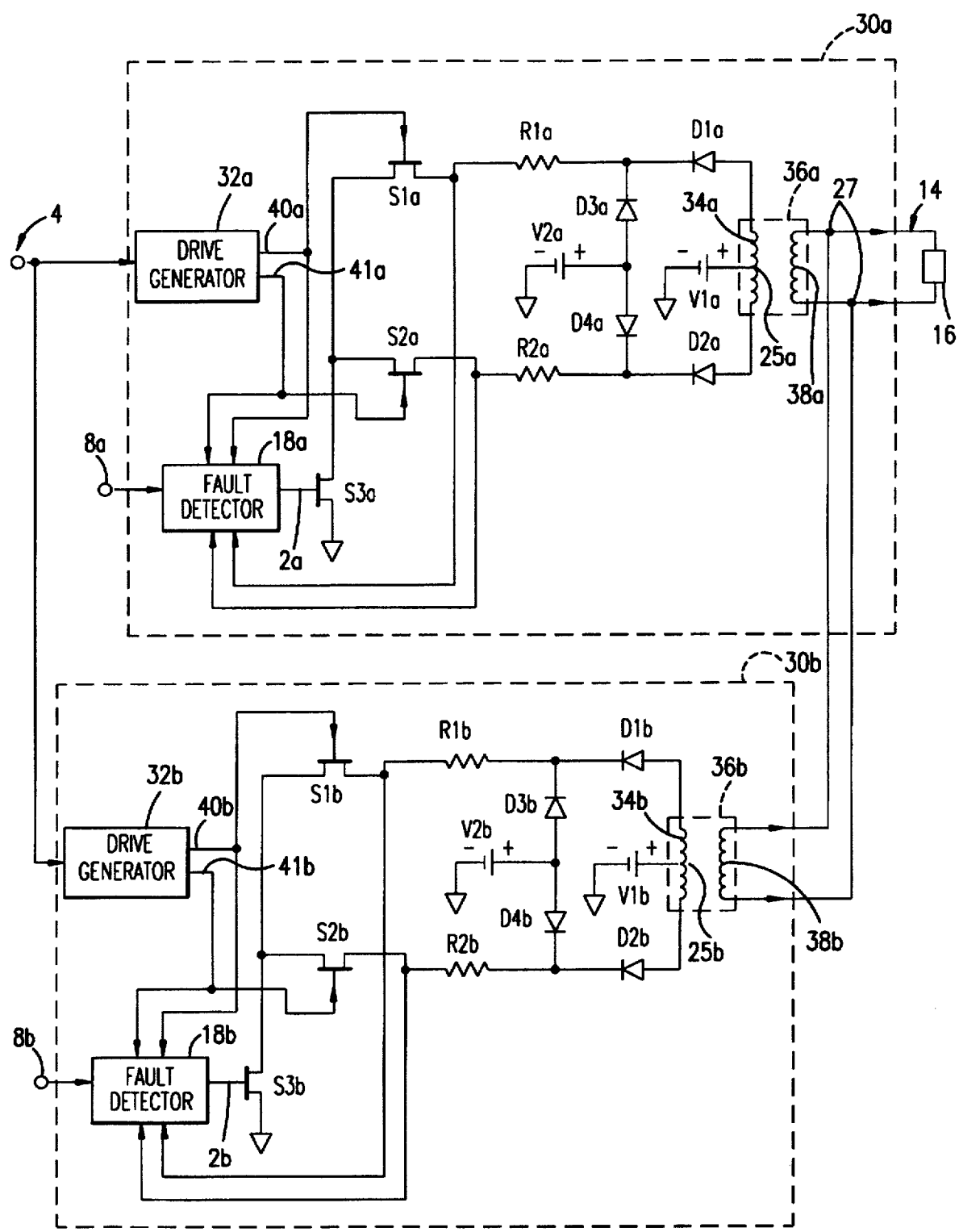
FIG. 2 shows a schematic of redundant line drivers of the present invention.

FIG. 2 shows a schematic of redundant line drivers 30a, 30b of the present invention. Each of the line drivers 30a, 30b is incorporated in a timing signal generator (not shown). A pair of line drivers is shown, but two or more line drivers may be connected across load 16. The line drivers 30a, 30b share the task of delivering a timing signal 14, i.e. power, to the load 16. The load 16 may comprise a transmission line or other equipment and circuitry within a digital telecommunication network. While both timing signal generators are functioning properly, the task of delivering power to the load 16 may be equally shared by line driver 30a and line driver 30b, but in the event of a fault in one of the timing signal generators, the majority of the power delivery is shifted to the line driver corresponding to the functioning timing signal generator. The operation of line driver 30a is described, although the description of the operation of line driver 30b is identical to that of line driver 30a.

Circuitry (not shown) within the timing signal generator provide the drive sync (synchronization) signal 4 which is applied to drive generator 32a. From the drive sync signal 4, drive generator 32a produces synchronous control pulses which activate, i.e. open and close, electronic switch S1a and electronic switch S2a. The control pulses may be timed to provide either square wave or alternate-mark-inversion (AMI) waveforms to the load 16. The AMI waveform has high states represented by alternating polarities.

When line driver 30a is correctly functioning, electronic switch S3a is closed, that is, in the conducting state. Electronic switch S1a, when closed, enables conduction through resistor R1a and conduction of diode D1a, while electronic switch S2a, when closed, enables conduction through resistor R2a and conduction of diode D2a. Current flow through diode D1a or diode D2a drives a primary 34a of transformer 36a. Power in the primary 34a is ultimately sourced by supply voltage V1a at the center-tap 25a of the primary 34a. Voltage in the primary 34a is limited by a pair of clamp diodes D3a and D4a, which constrain the voltage in the primary 34a to the difference between a clamp voltage V2a and the supply voltage V1a. The clamp voltage V2a and supply voltage V1a are chosen to achieve a timing signal 14 having a predetermined amplitude. In this embodiment, supply voltage V1a equals 12 volts and clamping voltage V2a equals 7 volts, yielding a voltage across the primary 34a of transformer 36a equal to 5 volts. Diode D1a compensates for the voltage drop and thermal characteristics of diode D3a, while diode D2a compensates for the voltage drop and thermal characteristics of diode D4a.

The clamping action of diodes D3a and D4a provide a controlled amplitude, phase and pulse shape for timing signal 14, whether the load 16 is driven with one or with both of the line drivers 30a, 30b. This amplitude independence is attributable to the absence of uncompensated resistance between the diodes D3a, D3b and the connection points 27 of the secondaries 38a, 38b of transformers 36a, 36b, respectively.

In the event of a fault in either the line driver, for example 30a, or other portion of the corresponding timing signal generator, conduction in the primary 34a of transformer 36a is ceased by opening electronic switch S3a. Electronic switch S3a is activated by squelch signal 2a supplied from fault detector circuit 18a which responds to a mismatch between the drive outputs 40a, 41a of drive generator circuit 32a and those of electronic switches S1a and S2a. Other fault conditions in the timing signal generator not related to the line driver 30a such as those in the circuitry (not shown) supplying drive sync signal 4, may also be supplied through fault input 8a to fault detector circuit 18a, which in turn activates electronic switch S3a.

A fault in one line driver (i.e. 30a) for example in the form of a short circuit of electronic switch S1a, generally initiates a time interval, during which, the other (functional) line driver 30b of the pair not only provides the power to the load which had previously been generated by the faulty line driver 30a, but also provides power to compensate for the power consumed by the fault itself. However, once the fault is detected by the fault detector circuit 18a, electronic switch S3a is opened, causing conduction in the primary 34a of transformer 36a to cease, relieving the functioning line driver 30b from providing the excess power incurred by the fault.

One or more redundant line driver circuits 30a, 30b may be connected across the secondary 38a of transformer 36a, such that the secondaries of each redundant line driver are connected across the load 16. As a result of the clamping action by the clamping diodes D3a and D4a and clamping diodes D3b and D4b, the amplitude, phase and pulse shape of the timing signal 14 at the load 16 is stabilized, regardless of the number of redundant line drivers connected across the secondary 38a of transformer 36a.

The redundant line drivers minimize the effect that failures in the timing signal generators have on the amplitude, phase and pulse shape of the timing signal 14 provided at the load 16. A single line driver is capable of providing the timing signal to the load 16 for example, while other, faulty line drivers are removed for replacement, or if multiple redundant line drivers are not used.

To further improve redundancy within a line driver 30a, the power dissipation elements, shown as resistors R1a, R2a may each be implemented using a pair of series connected resistors. In the event of a fault in the form of a short circuit of one of the resistors of a pair, the presence of the other resistor of the pair minimizes excess power consumed. Similarly, the clamping diode D3a and D4a and corresponding compensating diodes D1a, D2a may each be implemented using a pair of series connected diodes to minimize excess power consumed by a fault.

I claim:

1. A pair of line drivers for providing a timing signal to a load from a received drive sync, the pair of line drivers comprising:

a first drive source receiving the drive sync and producing a first drive signal;

a first power dissipation element attenuating the first drive signal;

a first clamp, limiting the attenuated first drive signal to produce a first clamped signal;

a second drive source receiving the drive sync and producing a second drive signal;

a second power dissipation element attenuating the second drive signal;

a second clamp, limiting the attenuated second drive signal to produce a second clamped signal;

a signal combiner receiving the first and second clamped signals and providing the timing signal having a predetermined amplitude, the predetermined amplitude dependent upon the first clamped signal and the second clamped signal.

2. The pair of line drivers of claim 1, further comprising a first fault detector monitoring the first drive signal and disabling the first drive source in response to a detected fault in the first drive signal, and further comprising a second fault detector monitoring the second drive signal and disabling the second drive source in response to a detected fault in the second drive signal.

3. The pair of line drivers of claim 2, the signal combiner including a first transformer and a second transformer, the first transformer having a first primary receiving the first clamped signal, the first primary coupled to a first secondary, and the second transformer having a second primary receiving the second clamped signal, the second primary coupled to a second secondary, wherein the first secondary and the second secondary are coupled to the load.

4. The pair of line drivers of claim 3, the first drive source further including a first switch connected in series with the first primary, the first drive source disabled by opening the first switch, and the second drive source further including a second switch connected in series with the second primary, the second drive source disabled by opening the second switch.

5. The pair of line drivers of claim 1, the first power dissipation element including a first pair of series connected power dissipation elements, the second power dissipation element including a second pair of series connected power dissipation elements, and the first clamp including a first pair of series connected clamps, and the second clamp including a second pair of series connected clamps.

6. A pair of line drivers for providing a timing signal to a load from a received drive sync, each line driver of the pair comprising:

a transformer primary having a center tap, a first terminal and a second terminal;

a voltage supply connected between a reference and the center tap;

a pair of parallel conduction paths, the first conduction path including a first switch and a first power dissipation element connected in series, the first conduction path between the first terminal and a connection node, and the second conduction path including a second switch and a second power dissipation element connected in series, the second conduction path between the second terminal and the connection node;

a squelching switch connected between the connection node and the reference, wherein conduction in the transformer primary is disabled when the squelching switch is open;

a drive generator receiving the drive sync and applying a first control signal to the first switch and applying a second control signal to the second switch, wherein closing the first switch in response to the applied first control signal enables conduction in the transformer primary and wherein closing of the second switch in response to the applied second control signal enables conduction in the transformer primary;

a first voltage clamp limiting voltage developed between the center tap and the first terminal to a predetermined level;

a second voltage clamp limiting voltage developed between the center tap and the second terminal to the predetermined level; and a transformer secondary connected to the load and producing the timing signal in response to conduction in the transformer primary.

7. The pair of line drivers of claim 6, each line driver of the pair further comprising a fault detector, opening the squelching switch in response to a detected fault.

8. The pair of line drivers of claim 7, the first voltage clamp including, a first compensating diode in the first conduction path, connected at a first end to the first terminal of the primary, a first clamping diode connected between the second end of the first compensating diode and a clamping voltage, wherein the predetermined level of the voltage developed between the center tap and the second terminal is the voltage difference between the voltage supply and the clamping voltage, and the second voltage clamp including, a second compensating diode in the second conduction path, connected at a first end to the second terminal of the primary, a second clamping diode connected between the second end of the second compensating diode and a clamping voltage, wherein the predetermined level of the voltage developed between the center tap and the second terminal is the voltage difference between the voltage supply and the clamping voltage.

9. A method for providing a timing signal to a load from a received drive sync, using a pair of line drivers, the method comprising:

receiving the drive sync;

producing a first drive signal from the received drive sync;

attenuating the first drive signal;

limiting the attenuated first drive signal to produce a first clamped signal;

producing a second drive signal from the received drive sync;

attenuating the second drive signal;

limiting the attenuated second drive signal to produce a second clamped signal;

receiving the first and second clamped signals and providing a timing signal having a predetermined amplitude, the predetermined amplitude dependent upon the first clamped signal and the second clamped signal.

10. The method of claim 9, further comprising the steps of monitoring the first drive signal and disabling the first drive signal in response to a detected fault in the first drive signal, and further comprising the steps of monitoring the second drive signal and disabling the second drive signal in response to a detected fault in the second drive signal.

* * * * *